United States Patent [19]

Cho

[11] Patent Number: 5,002,523
[45] Date of Patent: Mar. 26, 1991

[54] METHOD OF MANUFACTURING A WATERPROOF PAPER CONTAINER

[76] Inventor: Choong M. Cho, #803, 23-Dong, Hanyang Apt. San 2-21, Apkujung-Dong, Kangnam-Ku, Seoul, Rep. of Korea

[21] Appl. No.: 403,938

[22] Filed: Sep. 7, 1989

[30] Foreign Application Priority Data

Sep. 13, 1988 [KR] Rep. of Korea .................. 88 11810

[51] Int. Cl.⁵ .......................... B32B 1/10; B32B 1/08; B31C 11/04; B31C 11/06
[52] U.S. Cl. .................................. 493/273; 493/85; 493/111; 493/150; 493/274; 493/276; 493/292; 493/297
[58] Field of Search .................... 493/85, 93, 95, 96, 493/97, 98, 110, 111, 150, 273, 274, 276, 292, 297, 302, 406

[56] References Cited

U.S. PATENT DOCUMENTS

| 1,767,827 | 6/1930 | Woodford | 493/273 |
| 2,623,681 | 12/1952 | Wilcox | 493/297 |
| 3,457,130 | 7/1969 | Morrison | 493/297 |
| 3,544,669 | 12/1970 | Schock | 493/273 |
| 4,595,119 | 6/1986 | Cho | 220/450 |

Primary Examiner—Frederick R. Schmidt
Assistant Examiner—Jack W. Lavinder
Attorney, Agent, or Firm—Birch, Stewart, Kolasch & Birch

[57] ABSTRACT

A method of manufacturing a waterproof paper container which is a thick paper tube made of multiple paper layers by adhering an adhesive and coating a thermofusible synthetic resin on the surface of the adhesive.

3 Claims, 4 Drawing Sheets

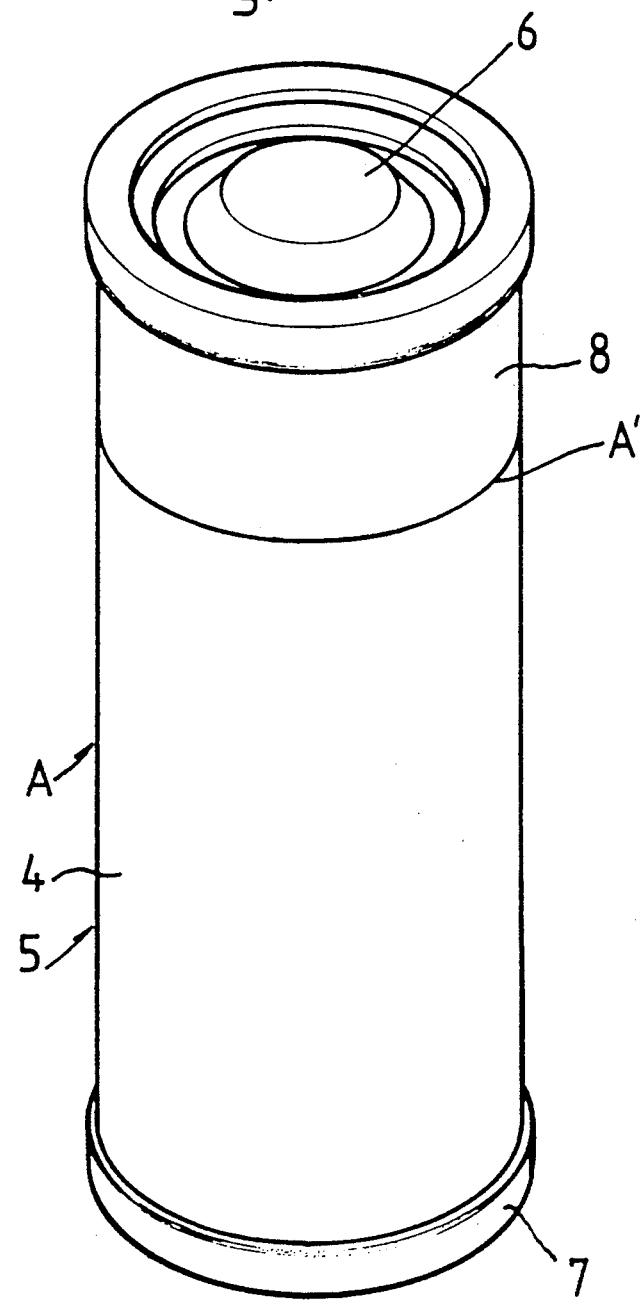

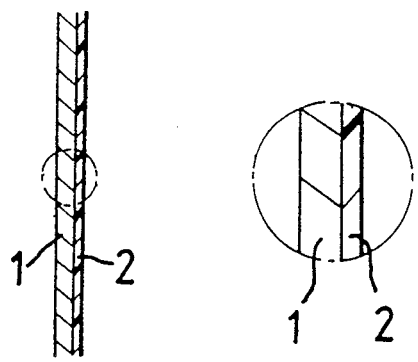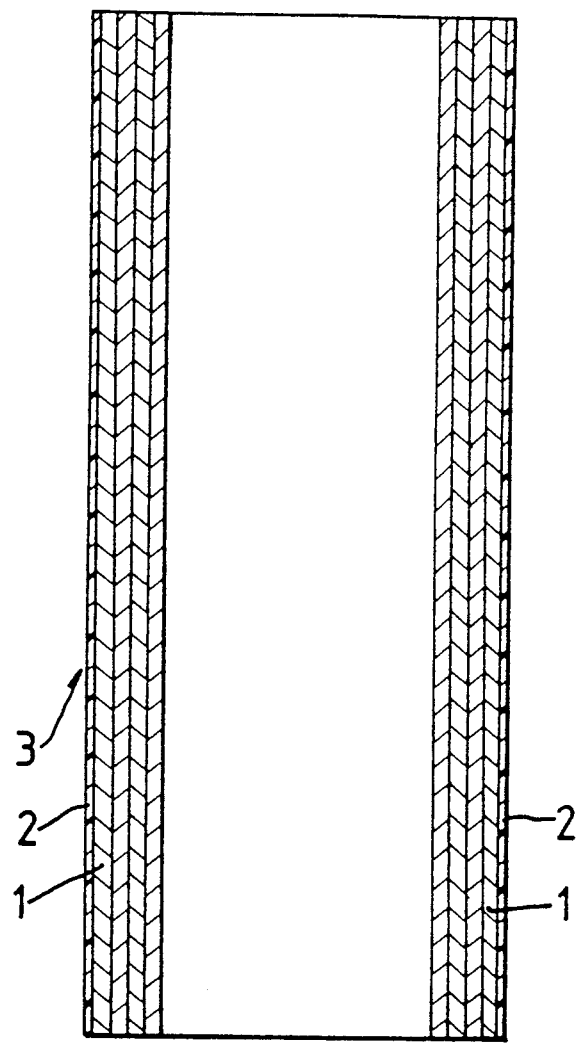

Fig. 4
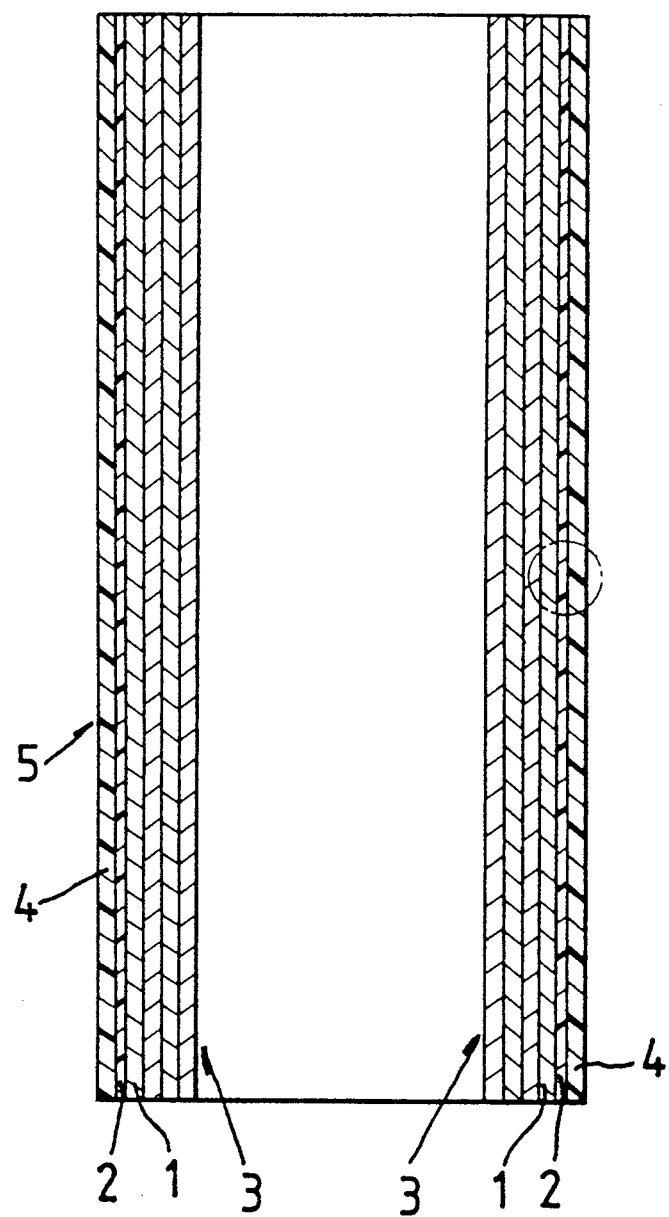
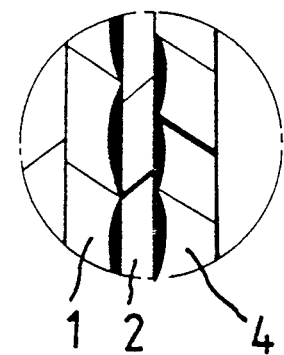
Fig. 4a

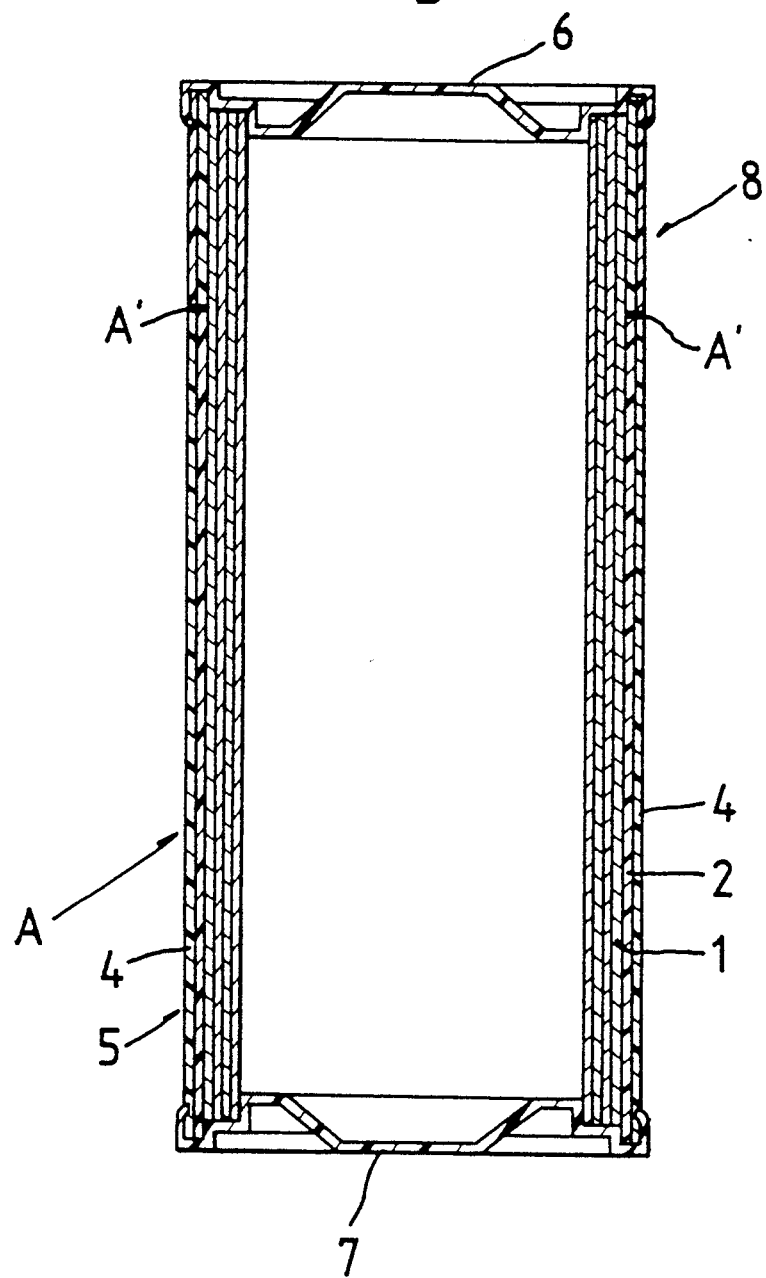

METHOD OF MANUFACTURING A WATERPROOF PAPER CONTAINER

BACKGROUND OF THE INVENTION

1. Field of the Invention

The present invention relates to a method of manufacturing a waterproof paper container for storing ammunitions and more particularly, a method of manufacturing a waterproof paper container which is a thick paper tube made of multiple paper layers by adhering an adhesive such as a hot molten adhesive on the exterior surface of the thick paper, and thereafter, coating by extruding a thermofusible synthetic resin on the surface of the adhesive.

2. Description of the Prior Art

In general, ammunition containers such as a fiber container or a fiber drum for storing ammunitions known in the art have a plurality of cases for storing the ammunitions for a long period of time and a plurality of cases for storing by heaping up in a warehouse. In as much as these conventional ammunition containers are structured with a cylindrical container simply folded in multiple with thick papers, it is real situation that great problem has been pointed out which may cause the inefficient result in detonation such as an early explosion, delayed explosion, or nonexplosion of the ammunitions owing to the deterioration of waterproof effect.

Accordingly, the present applicant developed an improvement in such ammunition container as disclosed in the U.S. Pat. No. 4,595,119 entitled "WATERPROOF PAPER CANISTER". However, since a thermofusible synthetic resin is coated integrally on the surface of the paper tube body, the paper tube and the thermofusible synthetic resin are different materials one another and a film is formed with polyethylene or polypropylene, the polyethylene or polypropylene cannot be penetrated into the paper tube and becomes impossible to maintain the strong adhesive strength.

Furthermore, since, when the thermofusible synthetic resin is coated by extruding on the external surface of the paper tube, the thermofusible synthetic resin becomes expanded at a high temperature and the paper tube is dehumidified causing the high temperature, it becomes a contracted state. Therefore, since, when the extruded and coated paper tube is cut by some voluntary size, the thermofusible synthetic resin is expanded while the paper tube is contracted in a normal temperature state, a moisture in the atmosphere becomes to penetrate into the paper tube and that the paper tube becomes expanded by the moisture.

Thus, since it is an unstable state that the adhering strength between the paper tube and the thermofusible synthetic resin is not present and they are loose from one another, the paper tube becomes expanded by the moisture in the atmosphere.

Therefore, since the magnitude of the paper tube becomes larger than that of the thermofusible synthetic layer for waterproofing, there are many disadvantages such as a bad waterproof effect.

SUMMARY OF THE INVENTION

Accordingly, it is an object of the present invention to provide an improved method of manufacturing a waterproof paper container for containing ammunitions.

Another object of the present invention is to provide a method of manufacturing a waterproof paper container which is a thick paper tube made of multiple paper layers by adhering an adhesive and coating a thermofusible synthetic resin on the surface of the adhesive.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a method of manufacturing a waterproof paper container which comprises the steps of adhering by heating and pressing an adhesive on the exterior surface of a thick paper, folding a piece of the thick paper several times so as to make a paper tube with any desired dimension, coating by extruding a thermofusible synthetic resin on the external surface of the adhesives while moving the paper tube so as to manufacture a finished paper tube, cooling the thermofusible synthetic resin of the finished paper tube by passing the finished paper tube through a cooling chamber, putting the paper finished tube into a hot chamber for giving stable to a layer of the thermofusible synthetic resin, putting the finished paper tube into a humidification chamber for humidifying the finished paper tube under the condition of saturated humidity, and cutting the finished paper tube with any desired dimension for manufacturing the waterproof paper container.

BRIEF DESCRIPTION OF THE DRAWINGS

The present invention will become more fully understood form the detailed description given hereinbelow and the accompanying drawings which are given by way of illustration only, and thus are not limitative of the present invention, and wherein:

FIG. 1 is a perspective view of the waterproof container manufactured by the method of the present invention;

FIG. 2 is a sectional view illustrating the step of adhering by heating and pressing the adhesive on the surface of an exterior of a thick paper according to the present invention;

FIG. 3 is a sectional view showing an whole paper tube adhered with the adhesives by heating and pressing on the exterior surface of the paper tube according to the present invention;

FIG. 4 is a sectional view showing a state that the synthetic resin is coated on the external surface of the adhesive; and FIG. 5 is a sectional view showing a waterproof paper container manufactured by the method according to the present invention.

DESCRIPTION OF THE PREFERRED EMBODIMENTS

The present invention will be described in detail with reference to the accompanying drawings hereinafter.

In the drawings, according to the present invention, an adhesive 2 such as a hot molten adhesive and the like is adhered by heating and pressing on the surface of the exterior surface of a thick paper 1 (FIGS. 1 and 2). A paper tube 3 having a predetermined size is made by folding a piece of the thick paper 1 several times as shown in FIG. 3. While moving the paper tube 3, the paper tube 3 is coated by extruding a thermofusible synthetic resin 4 such as polyethylene or the like on the external surface of the adhesive 2 of the paper tube 3 as shown in FIG. 4. The thermofusible synthetic resin 4 is cooled. A finished tube 5 into a hot chamber (not shown) so as to be stable in heat the thermofusible synthetic resin 4. Thereafter, the finished tube 5 is put into a humidification chamber (not shown) so as to humidify the paper tube 3 under the condition of a saturated humidity. Finally, the finished tube 5 is cut according to a desired predetermined dimension so as to obtain a waterproof paper container A as shown in FIG. 5. As shown in FIG. 1, the reference numeral 6 and 7 are top and bottom steel caps, respectively, and the numeral 8 is a lid portion.

In the present invention, since the adhesive 2 is adhered by heating and pressing before making the paper tube 3, the adhesive 2 is firmly penetrated into the thick paper 1.

Furthermore, when the thermofusible synthetic resin 4 is extruded and coated on the external surface of the adhesive 2 of the thick paper 1, the adhesive 2 and the thermofusible synthetic resin 4 contain a kind of resin having similarity one another so that the adhering strength of both parties may be greatly increased.

That is, since, when the thermofusible synthetic resin 4 is extruded on the external surface of the adhesives 2, the adhesives 2 are fused below the extruding temperature, the adhesive 2 is very much easily adhered with the thermofusible synthetic resin 4, consequently the adhering strength between the thermofusible synthetic resin and the paper tube 3 is greatly increased so that any spaces between both parties can be eliminated.

Thus, the finished paper tube 5 is increased with the adhering strength since, when the thermofusible synthetic resin 4 is extruded, the thermofusible synthetic resin 4 becomes expanded according to its extruding high temperature and a moving speed of the paper tube 3. Also the expanded synthetic resin 4 is put into the hot chamber so as to be stable in heat. That is, a layer of the expanded thermofusible synthetic resin 4 can be stable.

Although the magnitude of the coated thermofusible synthetic resin 4 and the paper tube 3 can be matched equally from one another, since the paper tube 3 has the dehumidified state in the extruding with the thermofusible synthetic resin 4. The moisture is absorbed according to the humidity in the atmosphere after or during manufacturing the paper container A and accordingly, the stability of dimension can be lacked. However, according to the present invention, since the finished tube 5 is stable by putting into the hot chamber and the paper tube 3 is humidified under the state of saturated humidity by passing through the humidification chamber, the humidity in the atmosphere is lower than that of the conventional paper tube. Accordingly, even if the finished tube 5 is exposed in the atmosphere, the expansion rate of the paper tube 3 can be minimized so that the stabilization of dimension with respect to the finished tube 5 can be obtained.

Thus in manufacturing the container A by using the finished paper tube 5 as shown in FIG. 5, since the layers of the thermofusible synthetic resin 4 become to contact one another at a contacting portion A' such as the top periphery of the container A and the bottom periphery of the lid 8, no exposure of the paper tube 3 is existed so that the penetration of the moisture can be prevented. The contacting portion A' is sealed by winding a adhesive tape (not shown) thereto. Since the adhesive tape can be removed and then sticked again, the container A can be reused. The reuse of the conventional container is impossible because the paper is sticked with the adhesive tape and is torn upon opening the lid by removing the adhesive tape.

Thus according to the present invention, the paper tube 5 and the thermofusible synthetic resin 4 are adhered by fusing with heat with the adhesive 4. The adhering strength is increased and the paper tube 5 is previously humidified so that the expansion due to the moisture in the atmosphere is prevented. The adhesive is rendered to penetrate into the external surface layer of the paper tube 5 so that the adhering strength between the layer of the thermofusible synthetic resin 4 and the finished paper tube 5 is increased and thereby the contraction and expansion are minimized and also the stability of dimension can be obtained. Therefore, the ammunition or other contents contained within the container A can be protected from the moisture of exterior or the temperature variation. The original ammunitions or other contents can be stored for a long period of time.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A method of manufacturing a waterproof paper container which comprises the steps of:
    (a) adhering by heating and pressing an adhesive on the exterior surface of a thick paper;
    (b) folding a piece of said thick paper several times so as to make a paper tube with any desired dimension;
    (c) coating by extruding a thermofusible synthetic resin on the external surface of said adhesives while moving the paper tube so as to manufacture a finished paper tube;
    (d) cooling said thermofusible synthetic resin of said finished paper tube by passing said finished paper tube through a cooling chamber;
    (e) putting said finished paper tube into a hot chamber for giving stability to a layer of said thermofusible synthetic resin;
    (f) putting said finished paper tube into a humidification chamber for humidifying said finished paper tube under the condition of saturated humidity; and
    (g) cutting the finished paper tube of step (f) with any desired dimension for manufacturing the waterproof paper container.

2. The method of manufacturing a waterproof paper container of claim 1, wherein the adhesive of step (a) is a hot molten adhesive.

3. The method of manufacturing a waterproof paper container of claim 1, wherein the thermofusible synthetic resin is polyethylene.

* * * * *